United States Patent
Jeon et al.

(10) Patent No.: US 12,147,708 B2
(45) Date of Patent: *Nov. 19, 2024

(54) WRITE DETERMINATION COUNTER

(71) Applicant: Micron Technology, Inc., Boise, ID (US)

(72) Inventors: Seungjune Jeon, Santa Clara, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,615

(22) Filed: Jan. 20, 2023

(65) Prior Publication Data

US 2023/0161510 A1     May 25, 2023

Related U.S. Application Data

(63) Continuation of application No. 16/997,426, filed on Aug. 19, 2020, now Pat. No. 11,561,729.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0605; G06F 3/0619; G06F 3/0653; G06F 3/0671
See application file for complete search history.

(56) References Cited

U.S. PATENT DOCUMENTS

| | | | |
|---|---|---|---|
| 7,974,029 B2 | 7/2011 | Tsai et al. | |
| 8,014,097 B1 | 9/2011 | Sanvido | |
| 8,531,793 B2 | 9/2013 | Bandic et al. | |
| 10,255,218 B1 | 4/2019 | Tse et al. | |
| 2017/0046083 A1 | 2/2017 | Park et al. | |
| 2017/0090782 A1 | 3/2017 | Lee | |
| 2017/0097782 A1 | 4/2017 | Ramalingam | |
| 2018/0336925 A1* | 11/2018 | Fulkerson | G11B 20/10009 |
| 2019/0212922 A1* | 7/2019 | Zhang | G06F 3/0688 |
| 2019/0258543 A1 | 8/2019 | Park | |
| 2019/0303043 A1* | 10/2019 | Charnevich | G06F 3/0679 |
| 2019/0369911 A1 | 12/2019 | Rai et al. | |
| 2020/0104206 A1 | 4/2020 | Kern et al. | |
| 2020/0151052 A1 | 5/2020 | Qawami et al. | |
| 2020/0183613 A1 | 6/2020 | Lee | |

(Continued)

*Primary Examiner* — Khoa D Doan
*Assistant Examiner* — Tong B. Vo
(74) *Attorney, Agent, or Firm* — Brooks, Cameron & Huebsch, PLLC

(57) ABSTRACT

A method includes performing a memory operation to access memory cells of a memory sub-system. The method can further include determining, for the memory operation, a quantity of memory cells available to be accessed during the performance of the memory operation. The method can further include determining that a quantity of memory cells that are accessed during the performance of the memory operation comprises fewer than the quantity of memory cells available to be accessed. The method can further include incrementing a counter in response to the determination that the quantity of memory cells accessed is fewer than the quantity of memory cells available to be accessed.

19 Claims, 5 Drawing Sheets

(56) References Cited

U.S. PATENT DOCUMENTS

| | | | |
|---|---|---|---|
| 2020/0194061 A1* | 6/2020 | Avital | G11C 29/50004 |
| 2020/0233604 A1 | 7/2020 | Kazama | |
| 2020/0249980 A1* | 8/2020 | Dutta | G06F 3/0611 |
| 2020/0264796 A1* | 8/2020 | Lyu | G06F 3/0646 |
| 2020/0278883 A1* | 9/2020 | Tan | G06F 11/0787 |
| 2020/0341843 A1* | 10/2020 | Lee | G06F 12/0238 |
| 2021/0132800 A1 | 5/2021 | Papandreou et al. | |
| 2021/0191797 A1* | 6/2021 | SeyedzadehDelcheh | G06F 11/076 |
| 2021/0279180 A1* | 9/2021 | Um | G06F 12/10 |
| 2022/0050640 A1 | 2/2022 | Jung et al. | |
| 2022/0229482 A1* | 7/2022 | Ba | G06F 1/3221 |

* cited by examiner

230

| | 235-1 | 235-2 | 235-3 | 235-4 | 235-5 | 235-6 | 235-7 | 235-8 | 235-9 | 235-N |
|---|---|---|---|---|---|---|---|---|---|---|
| MEMORY BITS | 0 | 1 | 1 | 0 | 1 | 0 | 0 | 1 | 1 | 1 |

| | 236-1 | 236-2 | 236-3 | 236-4 | 236-5 | 236-6 | 236-7 | 236-8 | 236-9 | 236-N |
|---|---|---|---|---|---|---|---|---|---|---|
| INTENDED WRITE | 1 | 1 | 0 | 0 | 0 | 0 | 1 | 1 | 0 | 1 |

| | 237-1 | 237-2 | 237-3 | 237-4 | 237-5 | 237-6 | 237-7 | 237-8 | 237-9 | 237-N |
|---|---|---|---|---|---|---|---|---|---|---|
| NORMAL WRITE | 1 | 1 | 0 | 0 | 0 | 0 | 1 | 1 | 0 | 1 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| MEMORY BITS | 0 | 1 | 1 | 0 | 1 | 0 | 0 | 1 | 1 | 1 |

| | 236-1 | 236-2 | 236-3 | 236-4 | 236-5 | 236-6 | 236-7 | 236-8 | 236-9 | 236-N |
|---|---|---|---|---|---|---|---|---|---|---|
| INTENDED WRITE | 1 | 1 | 0 | 0 | 0 | 0 | 1 | 1 | 0 | 1 |

| | 238-1 | 238-2 | 238-3 | 238-4 | 238-5 | 238-6 | 238-7 | 238-8 | 238-9 | 238-N |
|---|---|---|---|---|---|---|---|---|---|---|
| FORCE WRITE | 1 | 1 | 0 | 0 | 0 | 0 | 1 | 1 | 0 | 1 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| MEMORY BITS | 0 | 1 | 1 | 0 | 1 | 0 | 0 | 1 | 1 | 1 |
| | 245-1 | 245-2 | 245-3 | 245-4 | 245-5 | 245-6 | 245-7 | 245-8 | 245-9 | 245-N |
| ORIGINAL WRITE | 0 | 1 | 1 | 0 | 1 | 0 | 1 | 1 | 1 | 1 |
| | 239-1 | 239-2 | 239-3 | 239-4 | 239-5 | 239-6 | 239-7 | 239-8 | 239-9 | 239-N |
| | 1 | 0 | 0 | 1 | 0 | 1 | 0 | 0 | 0 | 0 |
| TOGGLE NORMAL WRITE | 242-1 | 242-2 | 242-3 | 242-4 | 242-5 | 242-6 | 242-7 | 242-8 | 242-9 | 242-N |
| | 0 | 1 | 1 | 0 | 1 | 0 | 1 | 1 | 1 | 1 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| MEMORY BITS | 0 | 1 | 1 | 0 | 1 | 0 | 0 | 1 | 1 | 1 |
| | 245-1 | 245-2 | 245-3 | 245-4 | 245-5 | 245-6 | 245-7 | 245-8 | 245-9 | 245-N |
| ORIGINAL WRITE | 0 | 1 | 1 | 0 | 1 | 0 | 1 | 1 | 1 | 1 |
| | 234-1 | 234-2 | 234-3 | 234-4 | 234-5 | 234-6 | 234-7 | 234-8 | 234-9 | 234-N |
| | 1 | 0 | 0 | 1 | 0 | 1 | 0 | 0 | 0 | 0 |
| TOGGLE FORCE WRITE | 244-1 | 244-2 | 244-3 | 244-4 | 244-5 | 244-6 | 244-7 | 244-8 | 244-9 | 244-N |
| | 0 | 1 | 1 | 0 | 1 | 0 | 1 | 1 | 1 | 1 |

*FIG. 2D*

WRITE DETERMINATION COUNTER

PRIORITY INFORMATION

This application is a continuation of U.S. application Ser. No. 16/997,426, filed on Aug. 19, 2020, the contents of which are incorporated herein by reference.

TECHNICAL FIELD

Embodiments of the disclosure relate generally to memory sub-systems, and more specifically, relate to a write determination counter.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 2A-2D illustrate examples of states of memory cells subsequent to performance of memory operations to access memory cells of a memory device in accordance with some embodiments of the present disclosure.

DETAILED DESCRIPTION

Figure 1:
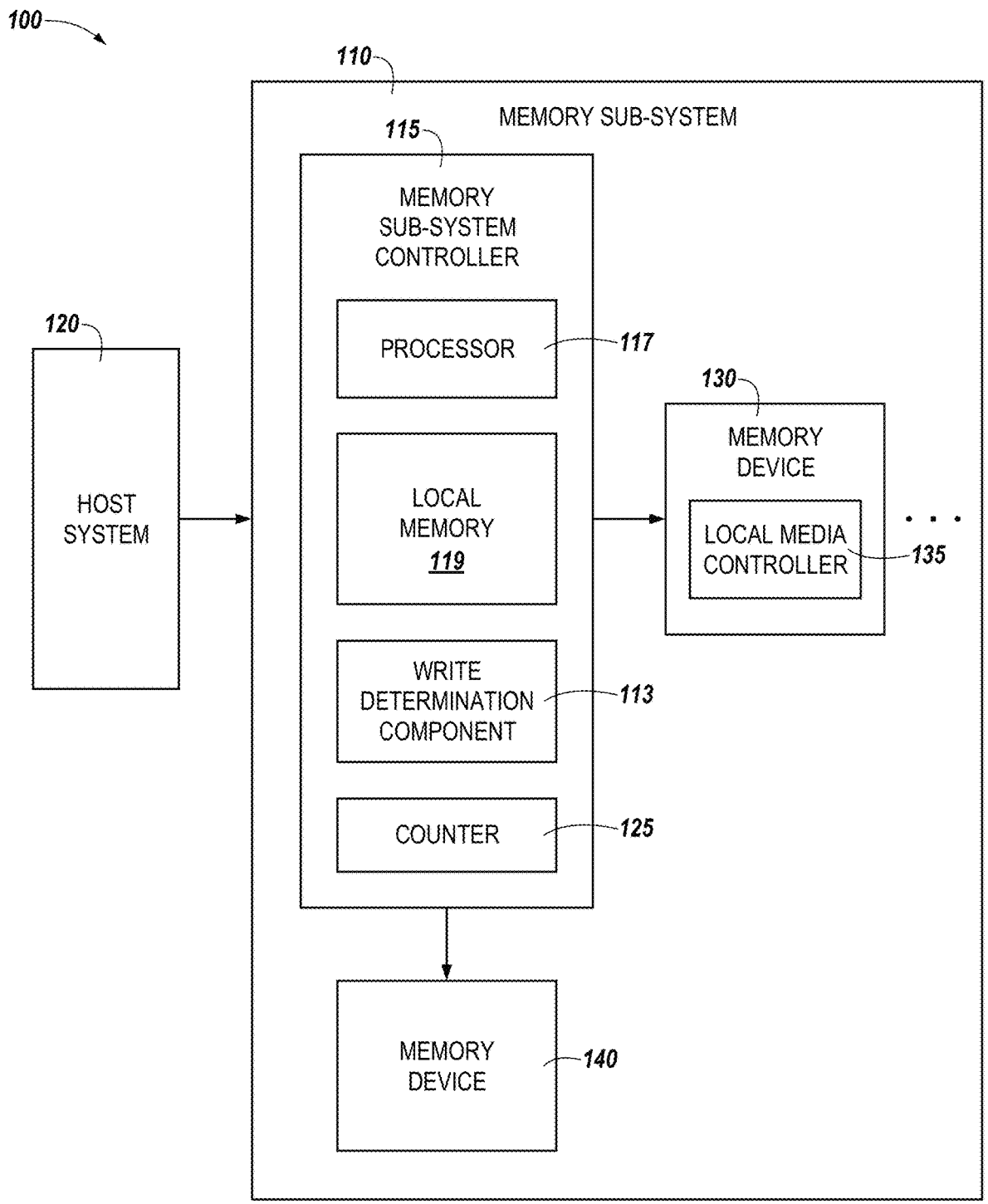
FIG. 1 illustrates an example computing system that includes a memory sub-system in accordance with some embodiments of the present disclosure.

Aspects of the present disclosure are directed to a write determination counter, in particular to memory sub-systems that include counters within a memory device that are incrementable based on determined characteristics of a memory operation. A memory sub-system can be a storage system, storage device, a memory module, or a combination of such. An example of a memory sub-system is a storage system such as a solid-state drive (SSD). Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that include a cross-point array of non-volatile memory cells. Other examples of non-volatile memory devices are described below in conjunction with FIG. 1. A memory operation (e.g., a read, write, or other memory operation) can be initiated to read from and/or write data to storage locations (e.g., memory cells) within the memory device. In some memory devices, such as three-dimensional cross-point memory devices, different write types can be used to write data into memory cells in the memory device. The write types can correspond to the quantity of memory cells accessed during the performance of the memory operation. The write types can correspond to a quantity of memory cells accessed during the memory operation being fewer than or equal to the quantity of memory cells accessible during the memory operation.

In some approaches, write operations may not be categorized based on the type of write operation invoked. This can give rise to a lack of differentiation in write types, which can cause uncertainty about the accuracy of the memory operation. For example, uncertainty regarding the quantity of memory cells accessed during the memory operation can, in some approaches, lead to a rewrite of all memory cells that can be accessed during a write operation. This can be problematic, especially in memory sub-systems that include memory devices that incur degradation of their associated memory cells in response to performance of memory operations. Accordingly, such approaches can lead to over-writes to sets of memory cells (e.g., memory cells associated with particular access units or management units of the memory device), which can lead to accelerated degradation of the memory sub-system.

Aspects of the present disclosure address the above and other deficiencies by incrementing a counter responsive to a determination of the quantity or percentage of memory cells accessed during the memory operation. Memory sub-systems (e.g., SSDs) can include various control circuitry, which can increment a counter responsive to a determination of the quantity of memory cells accessed during the memory operation. For example, a write determination component can be included in a memory sub-system to monitor the execution of various types of memory operations and to track access to particular memory cells during performance of the memory operations.

Incrementing a counter based on write type can validate the accuracy of the memory operation. The validation can be carried out by performance of a test operation to determine data reliability characteristics of the write operation, such as a bit error rate for a particular write operation. The test operation can be carried out responsive to a determination the that counter has exceeded a threshold value. A debugging operation can be executed based on the results of the test operation. In some embodiments, a command from a host can initiate the memory operation. The command can correspond to initiation of performance of the memory operation to access memory cells of a memory sub-system. In other embodiments, a command from a host can reset the memory operation. Embodiments are not so limited, however, and in some embodiments, the memory operations can be performed as background media operations, such as garbage collection, error correction, and/or wear leveling, among other background media operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a write determination component 113. Although not shown in FIG. 1 so as to not obfuscate the drawings, the write determination component 113 can include various circuitry to facilitate incrementing a write counter 125 based on write types (e.g., the write types illustrated in FIG. 2A-D, herein). For example, the write determination component 113 can include a special purpose circuitry in the form of an ASIC, FPGA, state machine, and/or other logic circuitry that can allow the write determination component 113 to orchestrate and/or perform the operations described herein.

The write determination component 113 can determine the write type of a memory operation. For example, in some embodiments, the write determination component 113 can determine the quantity of memory cells available to be accessed during a memory operation. In addition, the write determination component 113 can determine the quantity of memory cells accessed during a memory operation and whether the quantity of memory cells accessed during the memory operation were fewer or equal to the quantity of memory cells available to be accessed. In some embodiments, the write determination component 113 can increment a counter 125 based on the write type. That is, the write determination component 113 can increment a counter 125 based on the quantity of memory cells accessed by the memory sub-system controller 115 during the memory operation.

A counter 125 can be incremented based on the write type executed during the memory operation. That is, the counter 125 can be incremented to evidence whether the quantity of memory cells accessed during the memory operation was fewer than or equal to the quantity of memory cells available to be accessed during the memory operation. The value of the counter 125 for particular write types can allow for validation of the accuracy of the memory operation, as well as validation of the accuracy of memory operations characterized by other write types, as described herein.

The counter 125 can include hardware that can store one or more values (e.g., logical values, numerical values, etc.). For example, the counter 125 can be a cache (e.g., an SRAM cache), register/registers, latches, or the like. As described herein, the values can correspond to quantities of memory cells accessed during performance of a memory operation.

In some embodiments, the memory sub-system controller 115 includes at least a portion of write determination component 113. For example, the memory sub-system controller 115 can include a processor 117 (processing device) configured to execute instructions stored in local memory 119 for performing the operations described herein. In some embodiments, the write determination component 113 is part of the host system 110, an application, or an operating system.

FIGS. 2A-2D illustrate examples of states of memory cells subsequent to performance of memory operations to access memory cells of a memory device in accordance with some embodiments of the present disclosure. The memory cells 235-1 to 235-N shown in FIGS. 2A-2D can be programmed to various data states, such as a reset state corresponding to a data value of a logical 0 and a set state corresponding to a data value of a logical 1. Although embodiments are not so limited, a memory cell can have a greater resistance in the reset state than in the set state, for example. Further, the memory cells 235-1 to 235-N illustrated in FIGS. 2A-2D, taken together, represent a data pattern comprising the memory cells 235 prior to performing the respective memory operations 230, 231, 232, and 233, while the data pattern comprising the memory cells 237, 238, 239, 242, 234, and 244 respectively illustrated in FIGS. 2A-2D each represent a data pattern stored in the memory cells 235 as a result of performance of the respective memory operations 230, 231, 232, and 233.

FIG. 2A illustrates an example of states of memory cells subsequent to performance of a memory operation 230 to access memory cells 235-1 to 235-N of a memory sub-system in accordance with some embodiments of the present disclosure. The memory cells 235-1, 235-2, to 235-N (collectively referred to as the memory cells 235) within a memory sub-system (illustrated as 110 in FIG. 1) can store data (e.g., codewords). The memory sub-system can receive a command from a host via a host interface to write information into the memory cells. Read failures occur when memory cells have incorrect states. In some embodiments, the memory sub-system can receive a command from a host to initiate a memory operation to correct a read failure. the commands can be host operating system (Linux or Windows) commands that can be sent to the drives. In some embodiments the command can be vendor specific (e.g., ping drives). In other embodiments the command can be from a console or interface. The command can be a console terminal command and can use JTAG via serial port connection such as a USB in development or debugging environment. The memory operation initiated by the host can be to access memory cells of the memory sub-system. The memory cells 235 can be accessed during the memory operation to write, re-write, and/or overwrite the information stored therein.

The memory sub-system controller (illustrated as 115 in FIG. 1) can determine a quantity of memory cells 235 available to be accessed during the memory operation. The quantity of memory cells 235 to be written, re-written, or overwritten can be determined by a comparison between the quantity of memory cells 235 available to be accessed during a particular memory operation and a quantity of memory cells that are intended to be written, such as the intended write memory cells 236-1, 236-2, to 236-N (collectively referred to as intended write memory cells 236).

The quantity of memory cells 235 accessed during the memory operation can indicate to the memory sub-system the write type of the memory operation. For example, the write determination component 113 illustrated in FIG. 1, herein can determine the quantity of memory cells 235 that are accessed in performance of a memory operation and can provide information corresponding to the quantity of memory cells 235 accessed to the memory sub-system (e.g., to the memory sub-system controller) and/or to a host (e.g., the host system 120 illustrated in FIG. 1, herein). In some embodiments, the memory sub-system can include a stackable cross-gridded array that can receive writes that are characterized by various write types. That is, the quantity of memory cells 235 accessed during the performance of the memory operation in relation to the quantity of memory cells 235 available to be accessed during the memory operation can correspond to one of a number of write types. In some embodiments, four write types can be performed, which can include a normal write type, a force write type, a toggle normal write type, and/or a toggle force write type. However, embodiments are not so limited to the write types listed.

As shown in FIG. 2A, a normal write type can include accessing a quantity of memory cells that is fewer than the quantity of memory cells available to be accessed. In the example shown in FIG. 2, the stored values in the memory cells 235 that are updated to reflect the intended write values stored in the memory cells 236 that were accessed during a memory operation. In this example, the memory cells 237-1, 237-3, 237-5, 237-7, and 237-9 were accessed, while the memory cells 237-2, 237-4, 237-6, 237-8, and 237-N were not accessed. Continuing with this example, the memory cells 237-2, 237-4, 237-6, 237-8, and 237-N were not accessed as they corresponded with intended write memory cells 236-2, 236-4, 236-6, 236-8, and 236-N. As such, the quantity of memory cells accessed during the normal write memory operation (237-1, 237-3, 237-5, 237-7, and 237-9) were fewer than the quantity of memory cells that were available to be accessed (235-1, 235-2, 235-3, 235-4, 235-5, 235-6, 235-7, 235-8, 235-9, 235-N).

After the memory operation has been performed and the memory cells 235 have been accessed, a counter (as illustrated by 125 in FIG. 1) can be incremented in response to the determination of the quantity of memory cells accessed during the memory operation. That is, a counter can be incremented based on the write type executed during the memory operation. Here, a counter can be incremented evidencing that a normal write type was performed during the memory operation. That is, a counter can be incremented to evidence that the quantity of memory cells accessed during the memory operation was fewer than the quantity of memory cells available to be accessed during the memory operation. The value of the counter for particular write types can allow for validation of the accuracy of the memory operation, as well as validation of the accuracy of memory operations characterized by other write types, as described herein.

A threshold value can be set as an alert for the counter such that a test operation can be executed responsive to a determination that the counter has exceeded the threshold value. The test operation can be executed to determine the bit error rate of the memory cell. A debugging operation can be executed based on the results of the test operation. In some embodiments, a command from a host can reset the counter. The command can be executed to cause the counter value to be set to zero.

FIG. 2B illustrates an example of a state of memory cells subsequent to performance of a memory operation 231 to access memory cells 235-1 to 235-N of a memory sub-system in accordance with some embodiments of the present disclosure. As shown in FIG. 2B, the memory operation 231 can include similar elements as memory operation 230 as referenced in FIG. 2A. For example, the memory operation 231 can be executed to access the memory cells 235, which can be analogous to the memory cells 235 illustrated in FIG. 2A and intended write memory cells 236, which can be analogous to the intended write memory cells 236 illustrated in FIG. 2A.

The memory sub-system controller (illustrated as 115 in FIG. 1) can determine a quantity of memory cells 235 available to be accessed during the memory operation. Although ten memory cells 235 corresponding to a 10-bit codeword or access unit are illustrated, embodiments of the present disclosure are not limited to this particular configuration. The quantity of memory cells 235 to be changed can be determined by a comparison between the memory cells 235 and the intended write memory cells 236-1, 236-2, to 236-N (collectively referred to as intended write memory cells 236).

The quantity of memory cells 235 accessed during the memory operation can indicate to the memory sub-system the write type of the memory operation. As described above, the memory sub-system can include a stackable cross-gridded array of memory cells that can store data that is written according to one or more of the write types described herein. That is, the quantity of memory cells 235 accessed during the performance of the memory operation in relation to the quantity of memory cells 235 available to be accessed during the memory operation can correspond to one of multiple different write types. The write types can include normal write, force write, toggle normal write, and toggle force write. Embodiments are not so limited to the write types listed.

As shown in FIG. 2B, a force write type can include accessing a quantity of memory cells equal to the quantity of memory cells available to be accessed. In this illustration, memory cells 235-1 to 235-N were accessed during the memory operation in order to update the memory cell 235 to the intended write memory cells 236. The memory cells 238-1, 238-2, 238-3, 238-4, 238-5, 238-6, 238-7, 238-8, 238-9, 238-N were accessed and no memory cells were left untouched. As such, the quantity of memory cells accessed during the memory operation (238-1, 238-2, 238-3, 238-4, 238-5, 238-6, 238-7, 238-8, 238-9, 238-N) is equal to the quantity of memory cells that available to be accessed (235-1, 235-2, 235-3, 235-4, 235-5, 235-6, 235-7, 235-8, 235-9, 235-N).

After the memory operation has been performed and the memory cells 235 have been accessed, a counter may be incremented in response to the determination of the quantity of memory cells accessed during the memory operation. That is, a counter may be incremented based on the write type executed during the memory operation. A counter may be incremented evidencing that a force write type was performed during the memory operation. That is, a counter can be incremented to evidence that the quantity of memory cells accessed during the memory operation was equal to the quantity of memory cells available to be accessed during the memory operation.

A threshold value may be set for the force write type counter such that a test operation may be executed responsive to a determination that the force write type counter has exceeded the threshold value. The test operation may be executed to determine the bit error rate of the memory cell. A debugging operation can be executed based on the results of the test operation.

Original write memory cells 245-1 to 245-N (collectively referred to as original write memory cells 245) as illustrated in FIG. 2C and FIG. 2D can represent a data pattern originally and/or assumed to be stored in the memory cells 235. For example, original write memory cells 245 can be an error corrected data pattern of the memory cells 235 and/or a data pattern of memory cells 235 that is redundantly stored in another location of the memory sub-system.

FIG. 2C illustrates an example of a state of memory cells subsequent to performance of a memory operation 232 to access memory cells 235-1 to 235-N of a memory sub-system in accordance with some embodiments of the present disclosure. As shown in FIG. 2C, the memory operation 232 can include similar elements as memory operations 230 and 231 as referenced in FIG. 2A and FIG. 2B respectively. For example, the memory operation 232 can be executed to access the memory cells 235, which can be analogous to the memory cells 235 illustrated in FIG. 2A and FIG. 2B, and an intended write memory cells 236, which can be analogous to the intended write memory cells 236 illustrated in FIG. 2A and FIG. 2B.

A write operation shown in FIG. 2C corresponds to a write operation having a toggle normal write type that can rewrite a data pattern originally and/or assumed to be stored in the memory cells 235 as indicated by an original data pattern 245. FIG. 2C illustrates an example scenario where the memory cell 235-7 stores an erroneous bit that has been erroneously changed from logical 1 to logical 0.

The memory sub-system controller (illustrated as 115 in FIG. 1) can determine a quantity of memory cells 235 available to be accessed during the memory operation. Although ten memory cells 235 corresponding to a 10-bit codeword or access unit are illustrated, embodiments of the present disclosure are not limited to this particular configuration. The quantity of memory cells 235 to be changed can be determined by a comparison between the memory cells 235 and the intended write memory cells 236-1, 236-2, to 236-N (collectively referred to as intended write memory cells 236).

A write operation having the toggle normal write type can firstly read a data pattern from memory cells to invert the data pattern and write the inverted data pattern back to the memory cells. Accordingly, an inverted data pattern 239 of "1 0 0 1 0 1 0 0 0 0" with an error on the memory cell 235-7 corrected can be firstly written to the memory cells 235 by applying set/reset signals to the memory cells 235 except the memory cell 235-7, as illustrated in FIG. 2C. In some embodiments, a data pattern read from memory cells can be inverted without performing an error correction operation on the data pattern.

Subsequently, the inverted data pattern can be re-inverted and the re-inverted data pattern can be written back to the memory cells as part of performance of the write operation having the toggle normal write. As illustrated in FIG. 2C, for example, the inverted data pattern 239 of "1 0 0 1 0 1 0 0 0 0" can be read from the memory cells 235 and re-inverted to be a data pattern 242 of "0 1 1 0 1 0 1 1 1 1", which then can be written back to the memory cells 235. As illustrated in FIG. 2C, the re-inverted data pattern 242 can be written to the memory cells 235 by applying respective set/reset signals to all cells of the memory cells 242.

After the memory operation has been performed and the memory cells 235 have been accessed, a counter may be incremented in response to the determination of the quantity of memory cells accessed during the memory operation. That is, a counter may be incremented based on the write type executed during the memory operation. A counter may be incremented evidencing that a toggle normal write type was performed during the memory operation. That is, a counter can be incremented to evidence that the information of the quantity of memory cells available to be accessed during the memory operation is reversed and the quantity of memory cells accessed thereafter is fewer than to the quantity of memory cells available to be accessed during the memory operation. The multiple actions of a toggle normal write type counter may cause the memory cell to wear out at two times the rate of a normal write type.

A threshold value may be set for the toggle normal write type counter such that a test operation may be executed responsive to a determination that the toggle normal write type counter has exceeded the threshold value. The test operation may be executed to determine the bit error rate of the memory cell. A debugging operation can be executed based on the results of the test operation.

FIG. 2D illustrates an example of a state of memory cells subsequent to performance of memory operations 233 to access memory cells 235-1 to 235-N of a memory sub-system in accordance with some embodiments of the present disclosure. As shown in FIG. 2D, the memory operation 233 can include similar elements as memory operations 230, 231, and 232 as referenced in FIG. 2A, FIG. 2B, and FIG. 2C respectively. For example, the memory operation 233 can be executed to access the memory cells 235, which can be analogous to the memory cells 235 illustrated in FIG. 2A, FIG. 2B, and FIG. 2C, and an intended write memory cells 236, which can be analogous to the intended write memory cells 236 illustrated in FIG. 2A, FIG. 2B, and FIG. 2C.

The memory sub-system controller (illustrated as 115 in FIG. 1) can determine a quantity of memory cells 235 available to be accessed during the memory operation. Ten memory cells 235 corresponding to a 10-bit codeword or access unit are illustrated, embodiments of the present disclosure are not limited to this particular configuration. The quantity of memory cells 235 to be changed can be determined by a comparison between the memory cells 235 and the intended write memory cells 236.

A write operation shown in FIG. 2D corresponds to a write operation having a toggle force write type that can rewrite a data pattern originally and/or assumed to be stored in the memory cells 235 as indicated by an original data pattern 245. FIG. 2D illustrates an example scenario where the memory cell 235-7 stores an erroneous bit that has been erroneously changed from logical 1 to logical 0.

A write operation having the toggle force write type can firstly read a data pattern from memory cells to invert the data pattern and write the inverted data pattern back to the memory cells. Accordingly, an inverted data pattern 234 of "1 0 0 1 0 1 0 0 0" with an error on the memory cell 234-7 corrected can be firstly written to the memory cells 235 by applying set/reset signals to all cells of the memory cells 234, as illustrated in FIG. 2D. In some embodiments, a data pattern read from memory cells can be inverted without performing an error correction operation on the data pattern.

Subsequently, the inverted data pattern can be re-inverted and the re-inverted data pattern can be written back to the memory cells as part of performance of the write operation having the toggle write. As illustrated in FIG. 2D, for example, the inverted data pattern 234 of "1 0 0 1 0 1 0 0 0 0" can be read from the memory cells and re-inverted to be a data pattern 244 of "0 1 1 0 1 0 1 1 1 1", which then can be written back to the memory cells in data pattern 235. As illustrated in FIG. 2D, the re-inverted data pattern 244 can be written to the memory cells in data pattern 235 by applying respective set/reset signals to all cells of the memory cells 244.

A normal write (and/or a toggle normal write) can provide, as compared to a force write (and/or toggle force write), benefits such as less wearing out of memory cells and/or an increased throughput, because the normal write involves applying signal(s) only to those memory cells whose data values are to be programmed to a different data value, which typically results in applying less number of signals to the memory cells. In contrast, a force write (and/or toggle force write) can provide benefits such as higher reliability, because a force write reprograms all memory cells, as compared to a normal write (and/or toggle normal write), in which some memory cells that already have experienced drifts in threshold voltage distributions are not reprogrammed to correct the drifted threshold voltage distributions.

After the memory operation has been performed and the memory cells 235 have been accessed, a counter may be incremented in response to the determination of the quantity of memory cells accessed during the memory operation. That is, a counter may be incremented based on the write type executed during the memory operation. A counter may be incremented evidencing that a toggle force write type was performed during the memory operation. That is, a counter can be incremented to evidence that the information in the quantity of memory cells available to be accessed during the memory operation was reversed and the quantity of memory cells accessed thereafter is equal to the quantity of memory cells available to be accessed during the memory operation. The multiple actions of a toggle force write type may cause the memory cell to wear out at four times the rate a normal write type. The toggle force write type can also wear out at two times the rate of a force write type.

Various write types can be performed during a memory operation. One or more counters can be used to incremented for each write type that is executed during the memory operation. A counter can be incremented for a normal write while a different counter can be incremented for a force write. That is, one counter can be incremented when the quantity of memory cells accessed is fewer than the quantity of memory cells available to be accessed while a different counter can be incremented when the quantity of memory cells accessed is equal to the quantity of memory cells available to be accessed. Embodiments of the present disclosure are not so limited to this particular configuration. For example, a counter can be incremented for a force write while a different counter can be incremented for a toggle force write. That is, a counter can be incremented when the quantity of memory cells accessed is equal to the quantity of memory cells available to be accessed while a different counter can be incremented when the information within the quantity of memory cells available to be accessed is reversed and then the quantity of memory cells accessed is equal to the quantity of memory cells available to be accessed.

A threshold value may be set for the toggle force write type counter such that a test operation may be executed responsive to a determination that the toggle force write type counter has exceeded the threshold value. In one embodiment, the test operation can also be executed responsive to a determination that the counters have been combined to exceed the threshold value. That is, the test operation may be executed responsive to a determination that a counter and a different counter have collectively exceeded the threshold value. The test operation may be executed to determine the bit error rate of the memory cell. A debugging operation can be executed based on the results of the test operation. In some embodiments, a command from a host can reset the counter. The command can set the counter value to zero. In other embodiments, the command from the host interface can reset one or more of the counters.

Combining the counter for the memory operation for each of the write types (normal write, force write, toggle normal write, and toggle force write) can correspond to a counter that is incremented without reference to the quantity of memory cells accessed. That is, combining a counter for normal write and a counter for force write and a counter for toggle normal write, and a counter for toggle force write will produce a consistent number. The consistent number can remain the same if the counter for the memory operation is incremented without considering write types.

Figure 3:
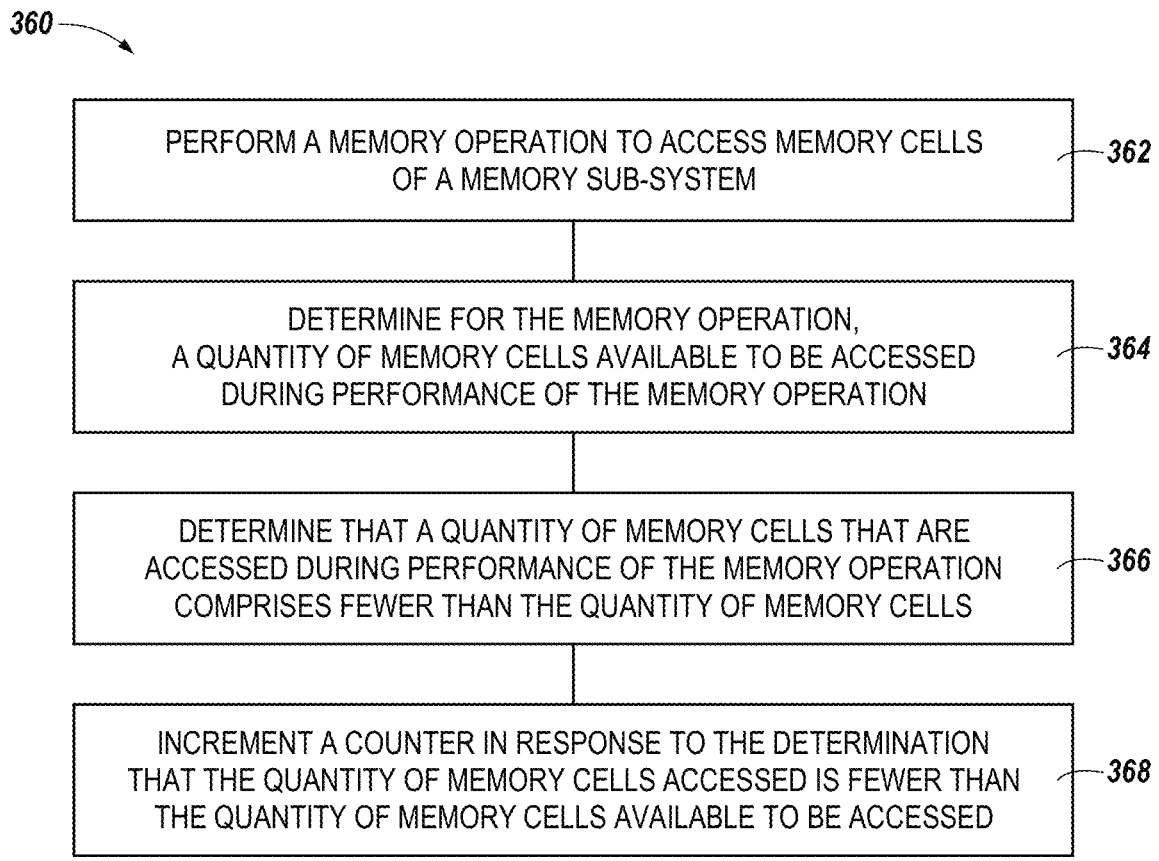
FIG. 3 is a flow diagram corresponding to a method for write determination counter in accordance with some embodiments of the present disclosure.

FIG. 3 is a flow diagram corresponding to a method 360 involving a write determination counter in accordance with some embodiments of the present disclosure. The method 360 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 360 is performed by the write determination component 113 of FIG. 1 and/or FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 362, the method 360 can include performing a memory operation to access memory cells of a memory sub-system. A command from a host (e.g., the host system 120 illustrated in FIG. 1, herein) can initiate the memory operation. A processing device (e.g., the processor 117 illustrated in FIG. 1, herein) can perform the memory operation to access memory cells of the memory sub-system. The memory cells can be accessed during the memory operation to change information stored therein. Read failures occur when memory cells have incorrect states. In some embodiments, the memory sub-system can receive a command from a host to initiate a memory operation to correct a read failure.

At block 364, the method 360 can include determining, for the memory operation, a quantity of memory cells available to be accessed during performance of the memory operation. To access the memory cells of the memory sub-system, a quantity of memory cells available to be accessed during performance of the memory operation can be ascertained. An understanding of the quantity of memory cells available to be accessed provides a baseline of comparison with the quantity of memory cells accessed during the memory operation to ascertain write types.

At block 366, the method 360 can include determining that a quantity of memory cells that are accessed during performance of the memory operation comprises fewer than the quantity of memory cells available to be accessed. The quantity of memory cells accessed during the memory operation can indicate to the memory sub-system the write type of the memory operation. When the quantity of memory cells that are accessed during performance of the memory operation are fewer than the quantity of memory cells available to be accessed, a normal write type was performed during the memory operation. In another embodiment, when the quantity of memory cells that are accessed during performance of the memory operation are equal to the quantity of memory cells available to be accessed, a force write type was performed during the memory operation.

At block 368, the method 360 can include incrementing a counter in response to the determination that the quantity of memory cells accessed is fewer than the quantity of memory cells available to be accessed. After the memory operation has been performed and the memory cells have been accessed, a counter can be incremented in response to the determination of the quantity of memory cells accessed during the memory operation. That is, a counter can be incremented based on the write type executed during the memory operation. Here, a counter can be incremented evidencing that a normal write type was performed during the memory operation. Incrementing a counter based on write type can validate the accuracy of a memory operation. A threshold value can be set as an alert for the counter such that a test operation can be executed responsive to a determination that the counter has exceeded the threshold value. The test operation can be executed to determine the bit error rate of the memory cell.

Figure 4:
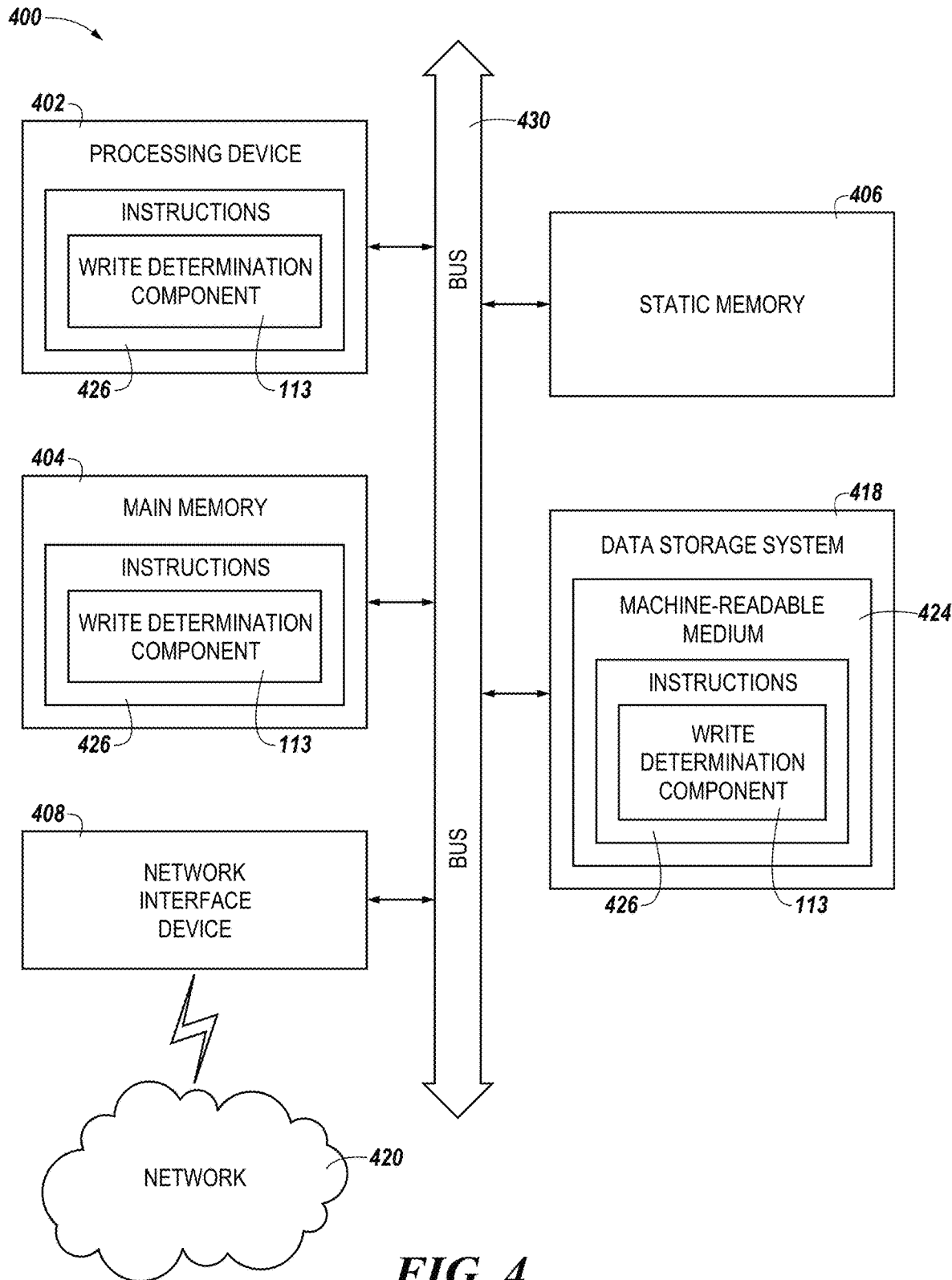
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write determination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 can execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a write determination component (e.g., the write determination component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    assigning a write type of a plurality of write types based on a quantity of memory cells accessed during performance of a memory operation involving memory cells of a memory device;
    incrementing a counter in response to a determination that a particular write type among the plurality of write types was involved in the performance of the memory operation and a determination that the quantity of memory cells that are accessed during the performance of the memory operation comprises fewer than a quantity of memory cells available to be accessed;
    incrementing a subsequent counter in response to a determination that another write type among the plurality of write types was involved in the performance of the memory operation and a determination that the quantity of memory cells that are accessed during the performance of the memory operation is equal to the quantity of memory cells available to be accessed; and
    executing a debugging operation responsive to one of the counter and the subsequent counter exceeding a threshold value.

2. The method of claim 1, further comprising monitoring a number of signals applied to the memory cells to determine a differentiation between the plurality of write types.

3. The method of claim 1, further comprising performing a test operation responsive to a determination that one of the counter and the subsequent counter exceeds the threshold value.

4. The method of claim 3, further comprising performing the test operation to validate an accuracy of the memory operation.

5. The method of claim 3, further comprising determining a bit error rate to perform the test operation.

6. The method of claim 1, further comprising incrementing a combined counter for each of the plurality of write types that is incremented without reference to the quantity of memory cells accessed.

7. The method of claim 6, performing the memory operation by accessing a stackable cross-gridded array of memory cells.

8. An apparatus, comprising:
    a memory sub-system; and
    a processing device within the memory sub-system, wherein the processing device is configured to perform a memory operation by accessing memory cells of the memory sub-system, and wherein the memory sub-system is configured to:
        differentiate between a plurality of write types based on a quantity of memory cells accessed during the performance of the memory operation by monitoring a number of signals applied to the memory cells;

increment a counter in response to a determination that a particular write type among the plurality of write types was involved in the performance of the memory operation and a determination that the quantity of memory cells that are accessed during the performance of the memory operation comprises fewer than a quantity of memory cells available to be accessed;

increment a subsequent counter in response to a determination that another write type among the plurality of write types was involved in the performance of the memory operation and a determination that the quantity of memory cells accessed is equal to the quantity of memory cells available to be accessed; and execute a debugging operation responsive to one of the counter and the subsequent counter exceeding a threshold value.

9. The apparatus of claim 8, wherein the quantity of memory cells that are available to be accessed correspond to a codeword size associated with the memory sub-system.

10. The apparatus of claim 8, wherein the quantity of memory cells that are available to be accessed correspond to an access unit associated with the memory sub-system.

11. The apparatus of claim 8, wherein one of the plurality of write types includes a normal write type and comprises correcting information within the memory cells that are accessed by accessing the quantity of memory cells that is fewer than the quantity of memory cells available to be accessed.

12. The apparatus of claim 8, wherein one of the plurality of write types includes a force write type and comprises correcting information within the memory cells that are accessed by accessing the quantity of memory cells equal to the quantity of memory cells available to be accessed.

13. The apparatus of claim 8, further comprising the processing device executing a vendor specific command from a host to reset one of the counter and the subsequent counter.

14. A system, comprising:
a memory device;
a counter resident on the memory device; and
a processing device, wherein the processing device is configured to perform one or more memory operations comprising:
assigning a write type of a plurality of write types based on a quantity of memory cells corresponding to a codeword size associated with the memory device accessed during performance of a memory operation to access memory cells of the memory device;

incrementing the counter in response to a determination that a particular write type among the plurality of write types was involved in the performance of the memory operation and a determination that the quantity of memory cells that are accessed during the performance of the memory operation comprises fewer than a quantity of memory cells available to be accessed;

incrementing a subsequent counter in response to a determination that another write type among the plurality of write types was involved in the performance of the memory operation and a determination that the quantity of memory cells accessed is equal to the quantity of memory cells available to be accessed; and executing a debugging operation responsive to one of the counter and the subsequent counter exceeding a threshold value.

15. The system of claim 14, wherein one of the plurality of write types includes a toggle normal write type which accesses the quantity of memory cells fewer than the quantity of memory cells available to be accessed.

16. The system of claim 15, wherein the toggle normal write type comprises correcting information existing within the memory cells by:

reversing the information within the memory cells; and accessing the quantity of memory cells fewer than the quantity of memory cells available to be accessed.

17. The system of claim 14, wherein one of the plurality of write types includes a toggle force write type which accesses the quantity of memory cells equal to the quantity of memory cells available to be accessed.

18. The system of claim 17, wherein the toggle force write type comprises correcting information within the memory cells by:

reversing the information within the memory cells; and accessing the quantity of memory cells equal to the quantity of memory cells available to be accessed.

19. The system of claim 17, wherein the toggle force write type wears out the memory cells at two times a rate of a force write type.

* * * * *